W. G. HIMROD.
Combined Plow and Harrow.
No. 209,046. Patented Oct. 15, 1878.
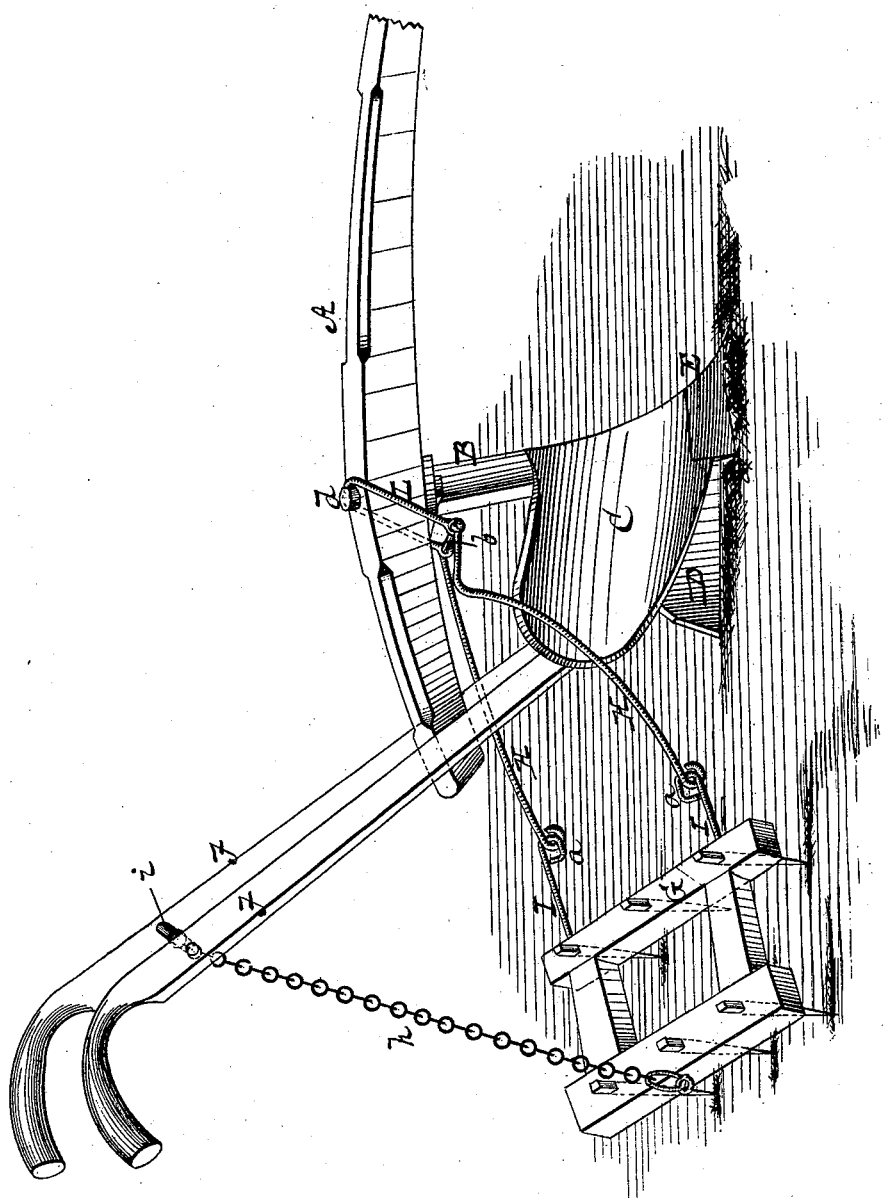

UNITED STATES PATENT OFFICE.

WILLIAM GIBSON HIMROD, OF EASTON, MARYLAND.

IMPROVEMENT IN COMBINED PLOW AND HARROW.

Specification forming part of Letters Patent No. 209,046, dated October 15, 1878; application filed March 4, 1878.

*To all whom it may concern:*

Be it known that I, WILLIAM G. HIMROD, of Easton, in the county of Talbot and State of Maryland, have invented certain new and useful Improvements in Harrow Attachments for Plows; and I do hereby declare the following to be a full, clear, and exact description thereof, reference being had to the accompanying drawings, and to the letters of reference marked thereon.

The nature of my invention consists in the construction and arrangement of a harrow attachment for plows, as will be hereinafter more fully set forth.

In order to enable others skilled in the art to which my invention appertains to make and use the same, I will now proceed to describe its construction and operation, referring to the annexed drawing, which forms a part of this specification, and which represents a perspective view of my improved harrow attachment connected to a plow.

A represents a plow-beam, with plow foot or standard B, mold-board C, land-side D, share E, and handles F F, all constructed in any of the well-known and usual ways.

G represents a harrow, which may be constructed in any well-known manner. This harrow is at its front provided with two forwardly-extending rods or arms, I I, the outer ends of which form loops or eyes a a. In these loops or eyes are connected two curved rods or bars, H H, in such a manner as to form flexible joints, which rods or bars extend forward on opposite sides of the handles F F, and their front ends pivoted by a pin, b, in a bail or stirrup, L, below the plow-beam, said bail or stirrup passing around the plow-beam and hooking over a lug, projection, or bolt, d, on top of said beam. This lug or projection may be the end of the bolt or one of the bolts which fasten the standard B to the plow-beam, or it may be specially formed on or attached to the plow-beam for the purpose.

A chain, h, connects the rear portion of the harrow G with the round i, which connects the two handles.

I am fully aware that harrows have been connected to plows, and I do therefore not claim such combination broadly as my invention.

With my construction of the harrow attachment the harrow will adjust or accommodate itself to any unevenness of the ground, and the operator walking behind the plow can at any time, by means of the chain h, raise the same so as to pass over any obstructions that may be in the way.

My invention is limited to the particular construction and arrangement of the devices whereby the harrow is connected to the plow, these devices being such that it is only a moment's work to attach or detach the harrow from the plow, and the harrow rendered perfectly flexible and self-adjusting.

Having thus fully described my invention, what I claim as new, and desire to secure by Letters Patent, is—

In combination with a plow having a bolt or projection, d, on top of its beam, the harrow G, arms I I, and rods H H, flexibly connected together at a a, the bail L passing around the plow-beam and hooked upon the projection d, and the ends of the bail connected to the rods H by the removable pin b, forming a second joint, and the rear adjusting-chain h, all constructed substantially as and for the purposes herein set forth.

WILLIAM G. HIMROD.

Witnesses:
DAVID C. AVERY,
NATHANIEL TUTHILL.